(12) United States Patent
Shimizu et al.

(10) Patent No.: US 11,831,976 B2
(45) Date of Patent: *Nov. 28, 2023

(54) DISPLAY APPARATUS

(71) Applicant: Maxell, Ltd., Kyoto (JP)

(72) Inventors: Hiroshi Shimizu, Kyoto (JP); Ikuya Arai, Kyoto (JP); Yasunobu Hashimoto, Kyoto (JP); Tomonori Nomura, Kyoto (JP); Osamu Kawamae, Kyoto (JP); Kazuhiko Yoshizawa, Kyoto (JP); Naohisa Takamizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,223

(22) Filed: Sep. 21, 2022

(65) Prior Publication Data

US 2023/0017875 A1  Jan. 19, 2023

Related U.S. Application Data

(63) Continuation of application No. 17/298,027, filed as application No. PCT/JP2018/044149 on Nov. 30, 2018, now Pat. No. 11,483,483.

(51) Int. Cl.
*H04N 23/63* (2023.01)
*G06F 1/16* (2006.01)
(Continued)

(52) U.S. Cl.
CPC ......... *H04N 23/631* (2023.01); *G06F 1/1686* (2013.01); *G06F 3/013* (2013.01); *G06T 19/006* (2013.01); *H04N 23/80* (2023.01)

(58) Field of Classification Search
CPC ......... G06F 1/163; G06F 3/011; G06F 3/013; G06F 3/0346; G06F 2200/1637;
(Continued)

(56) References Cited

U.S. PATENT DOCUMENTS 10,679,413 B2 *  6/2020  Knight ................. G06T 7/194
2013/0135295 A1  5/2013  Li et al.
(Continued)

FOREIGN PATENT DOCUMENTS

EP  3 337 161 A1  6/2018
JP  2000-276613 A  10/2000
(Continued)

OTHER PUBLICATIONS

International Search Report and Written Opinion dated Feb. 12, 2019, received for PCT Application PCT/JP2018/044149, Filed on Nov. 30, 2018, 12 pages.
(Continued)

*Primary Examiner* — Nelson M Rosario
(74) *Attorney, Agent, or Firm* — XSENSUS LLP

(57) ABSTRACT

A display apparatus that includes a first imaging unit that images a user, a first distance detector that identifies an eye of the user and measure a first distance that is a distance from the identified eye to the first imaging unit, a second imaging unit that images an object, a second distance detector that measures a second distance that is a distance from the second imaging unit to the object, an image processor that processes the images, and a display unit, the image processor calculating a display imaging range, extracting the calculated display imaging range from the image imaged by the second imaging unit, and causing the display unit to display it, and the display imaging range being such a range that the object displayed and an external scenery not interrupted by the display unit seen from a viewpoint of the user have the same size.

14 Claims, 6 Drawing Sheets

$H2 = (L1+L2)/L1 \times H1$
$\theta 2 = 2 \times \tan^{-1}((H2/2)/L2)$
DISPLAY MAGNIFICATION RATIO $M = \theta 2 / \theta 1$

(51) Int. Cl.
  *G06F 3/01* (2006.01)
  *G06T 19/00* (2011.01)
  *H04N 23/80* (2023.01)
(58) Field of Classification Search
  CPC ......... G06T 19/006; G06T 7/337; G06T 7/50; G06T 7/74; G06T 7/97; G06T 2207/10028; G06T 2207/30201; G06T 2207/30244; G02B 2027/0112; G02B 2027/0118; G02B 2027/0178; G02B 27/017
  See application file for complete search history.

(56) References Cited

U.S. PATENT DOCUMENTS

| | | |
|---|---|---|
| 2016/0078680 A1 | 3/2016 | Reif et al. |
| 2018/0160093 A1 | 6/2018 | Wu |

FOREIGN PATENT DOCUMENTS

| | | |
|---|---|---|
| JP | 2006-238033 A | 9/2006 |
| JP | 2011174993 A | 9/2011 |
| JP | 2011-248655 A | 12/2011 |
| JP | 2012-80193 A | 4/2012 |
| JP | 2012-190230 A | 10/2012 |
| JP | 2013-258583 A | 12/2013 |
| JP | 2017-525052 A | 8/2017 |

OTHER PUBLICATIONS

Japanese Office Action dated Jun. 27, 2023 in corresponding Japanese Patent Application No. 2022-150100 (with English translation), 6 pages.

\* cited by examiner $H2 = (L1+L2)/L1 \times H1$
$\theta 2 = 2 \times \tan^{-1}((H2/2)/L2)$
DISPLAY MAGNIFICATION RATIO $M = \theta 2 / \theta 1$

DISPLAY APPARATUS

CROSS-REFERENCE TO RELATED APPLICATIONS

The present application is a continuation of U.S. application Ser. No. 17/298,027, filed May 28, 2021, which is based on PCT filing PCT/JP2018/044149, filed Nov. 30, 2018, the entire contents of which are incorporated herein by reference.

TECHNICAL FIELD

The present invention relates to a display apparatus, particularly, to a technique effective for an image processing of displaying a state of superimposing a virtual object on a virtual reality image.

BACKGROUND ART

In recent years, with progress of an image processing technique represented by MR (Mixed Reality), VR (Virtual Reality), or AR (Augmented Reality) technique and with an increase in performance of electronic terminals including display apparatuses such as HMD (Head Mounted Display), tablet terminals, and smartphone terminals that display image-processed results, a large number of contents and apparatuses for superimposedly displaying a virtual object on an image of a real space or a virtual reality video have been developed.

As a main image display technique as mentioned above, for example, by receiving an operation(s) on an electronic device with an image captured (photographed) by a camera being displaced, there is a technique for operating the electronic device while the captured image is viewed (see, for example, Patent Document 1).

As another image display technique, known has been a technique in which an area where a photographer's field of view is interrupted on a display screen is imaged by a camera and is displayed on the display screen (see, for example, Patent Document 2), a technique in which an image display with a high degree of reality is realized by displaying an image according to a line-of-sight direction of a viewer who views the screen (see, for example, Patent Document 3), or the like.

RELATED ART DOCUMENTS

PATENT DOCUMENT 1: Japanese Patent Application Laid-open No. 2006-238033
PATENT DOCUMENT 2: Japanese Patent Application Laid-open No. 2012-080193
PATENT DOCUMENT 3: Japanese Patent Application Laid-open No. 2012-190230

SUMMARY OF THE INVENTION

Problems to be Solved by the Invention

In the techniques of Patent Documents 1 to 3 described above, correction has been performed for changes in a direction and an angle of the terminal, a change in a user's line of sight, and the like when an imaged image is displayed on a display unit. However, such techniques make no consideration for a size etc. of the image displayed after the correction.

In other words, in a case etc. of holding the electronic terminal in a hand(s), no consideration is made for: a change in a visible way of the display screen due to deviation of the user's line-of-sight direction or viewing distance; deviation of the display screen due to an influence caused by an attachment position of the camera installed in the electronic terminal; or the like.

As a result, a problem arises in that the user has uncomfortable feeling etc. about an image such as a virtual object superimposedly displayed in the real space.

An object of the present invention is to provide a technique capable of providing a virtual space without uncomfortable feeling by displaying the virtual space so as to be equivalent to the real space.

The above and other objects and novel features of the present invention will be apparent from the description of the present specification and the accompanying drawings.

Means for Solving the Problems

The following is a brief description of the outline of the typical invention disclosed in the present application.

That is, a typical display apparatus has a first imaging unit, a first distance detector, a second imaging unit, a second distance detector, an image processor, and a display unit. The first imaging unit is provided on a first surface and images a user. The first distance detector identifies eyes of the user imaged by the first imaging unit and measures a first distance, which is a distance from the identified eyes to the first imaging unit.

The second imaging unit is provided on a second surface opposite to the first surface and images an object. The second distance detector measures a second distance which is a distance from the second imaging unit to an object imaged by the second imaging unit.

The image processor performs an image processing on the images imaged by the first imaging unit and the second imaging unit. The display unit displays the image image-processed by the image processor.

In addition, the image processor calculates a display imaging range displayed on the display unit based on the first distance measured by the first distance detector, the second distance measured by the second distance detector, and height of the display unit, extracts the calculated display imaging range from the image imaged by the second imaging unit, and causes the display unit to it.

Then, the display imaging range calculated by the image processor is such a range that the object displayed on the display unit and an external scenery not interrupted by the display unit seen from a viewpoint of the user have the same size.

In particular, the image processor generates a virtual video with a display size adjusted according to the display imaging range and causes the display unit to display it.

Effects of the Invention

The effects obtained by the typical ones of the inventions disclosed in the present application will be briefly described as follows.

The uncomfortable feeling about the image displayed on the display apparatus can be reduced.

BRIEF DESCRIPTIONS OF THE DRAWINGS

Figure 1:
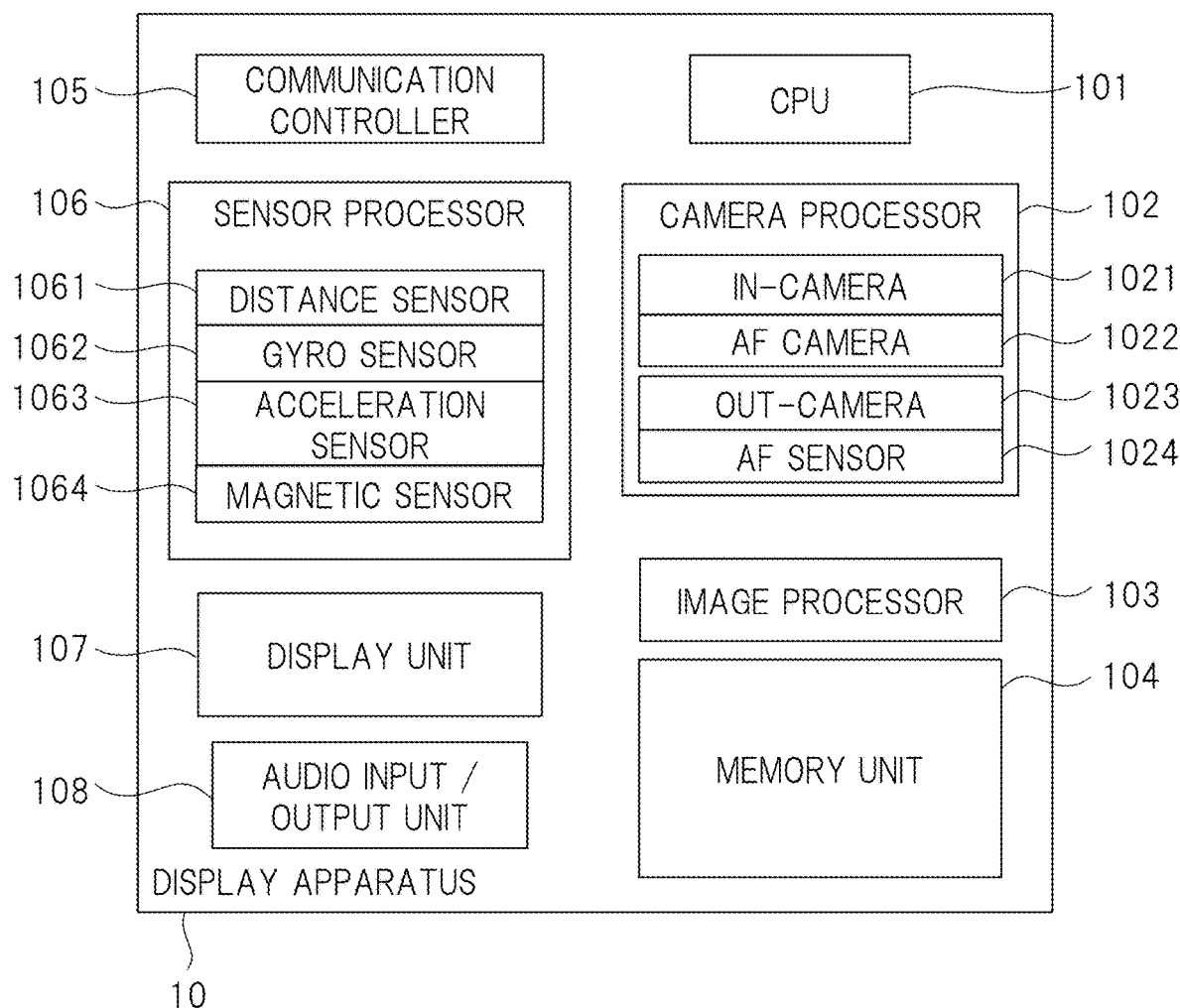
FIG. 1 is an explanatory diagram showing an example of a configuration of a display apparatus according to a first embodiment.
Figure 4:
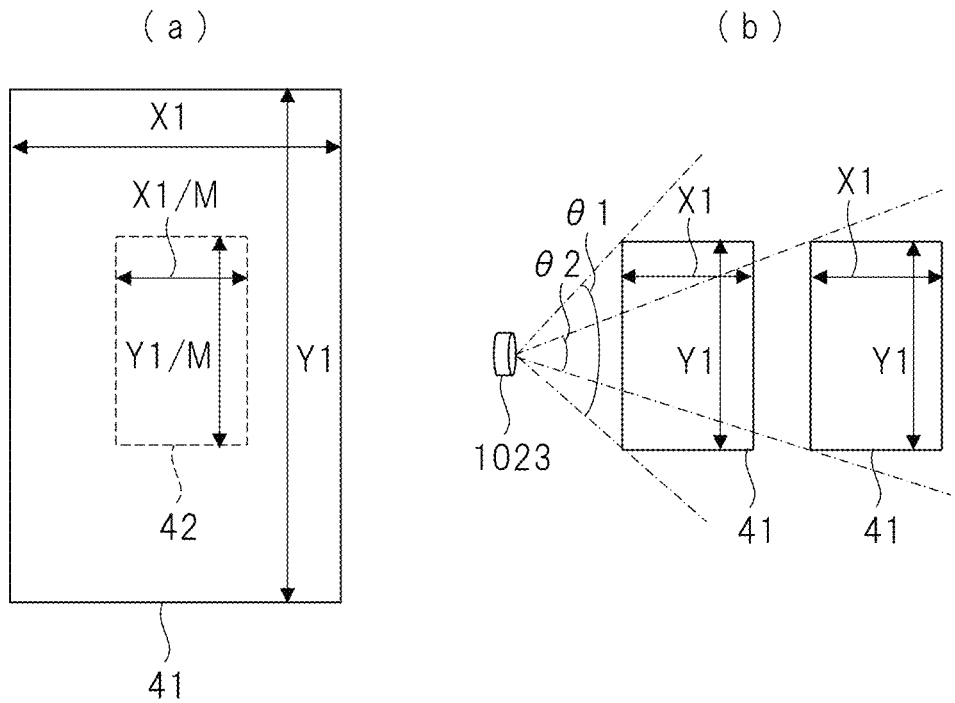
Figure 5:
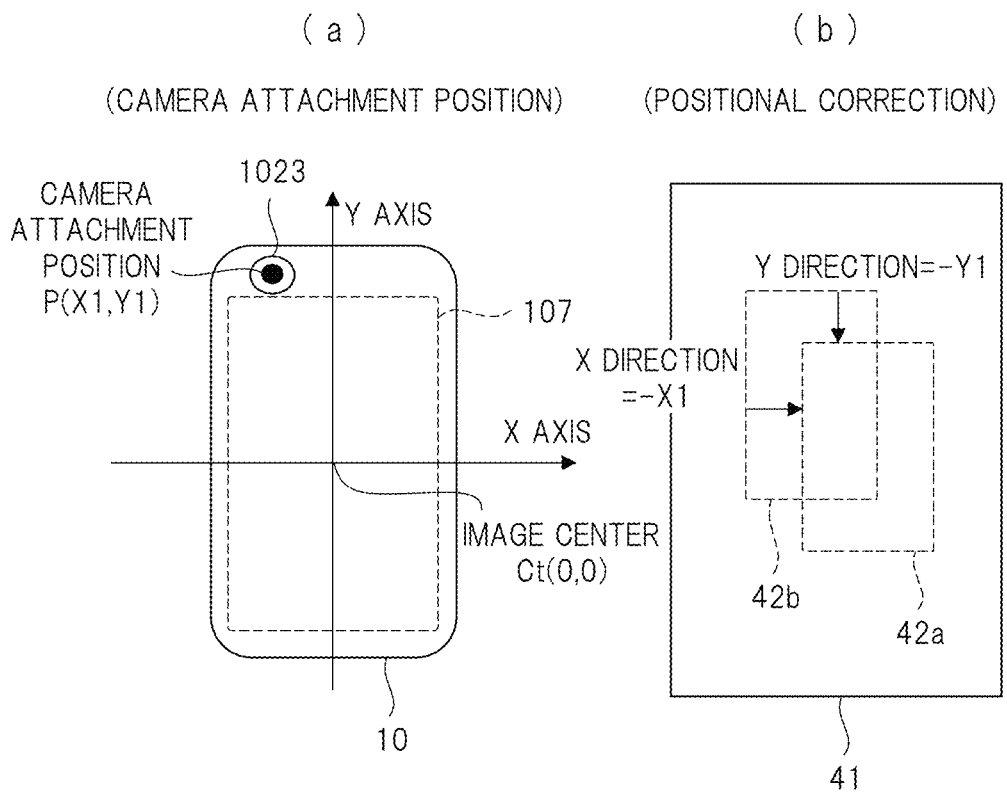
Figure 6:
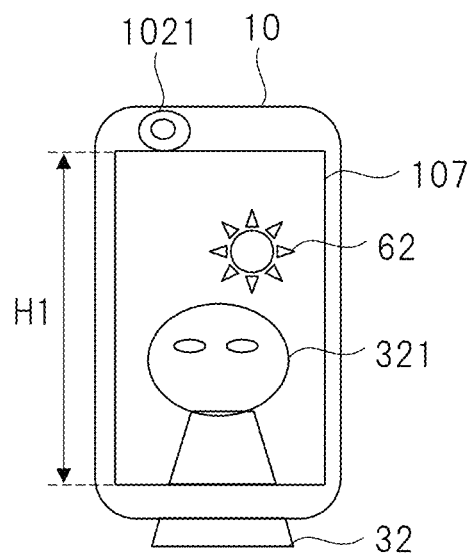
Figure 7:
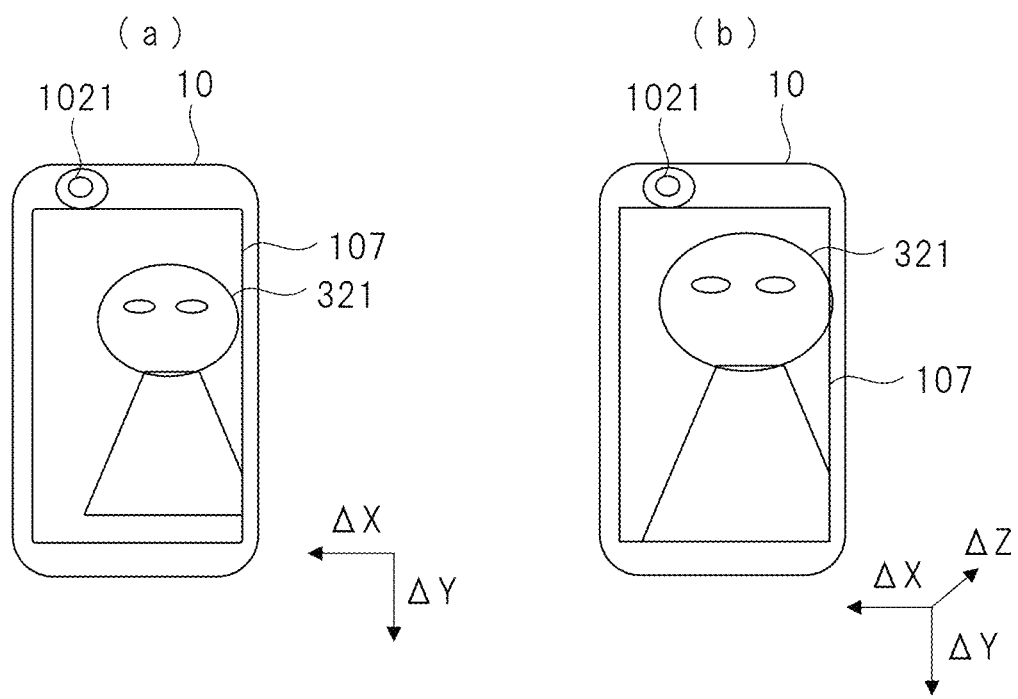
Figure 8:
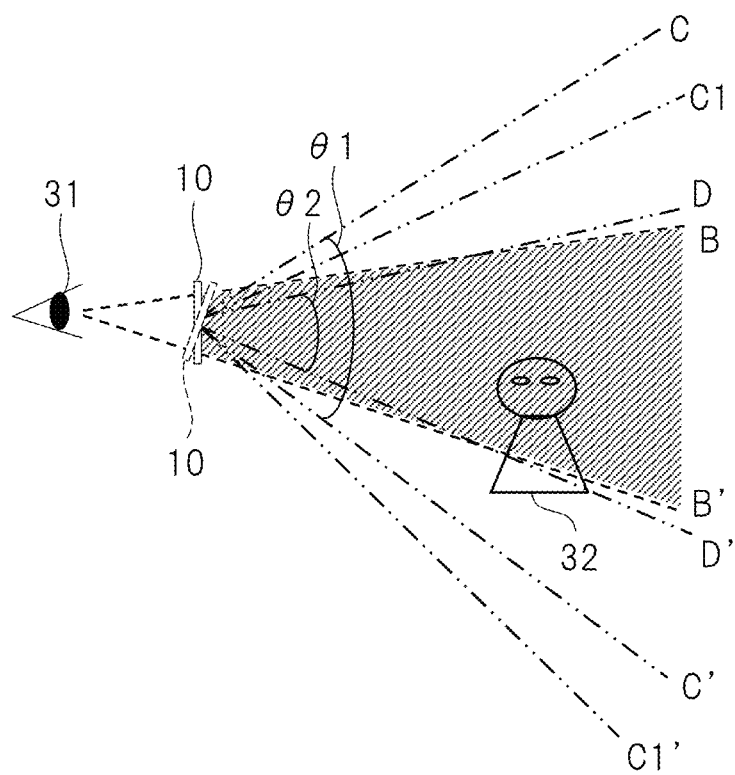
Figure 9:
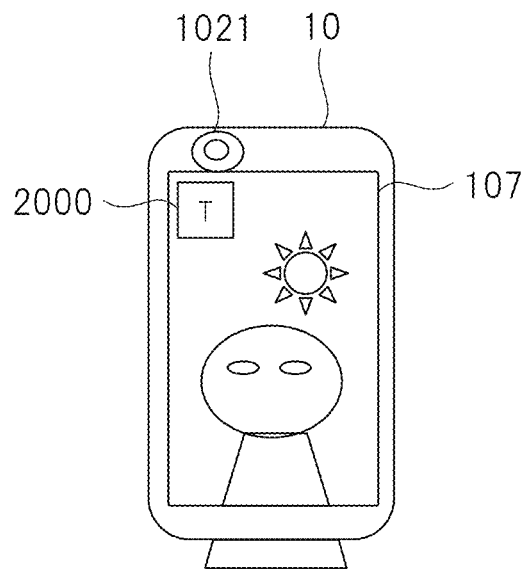
Figure 10:
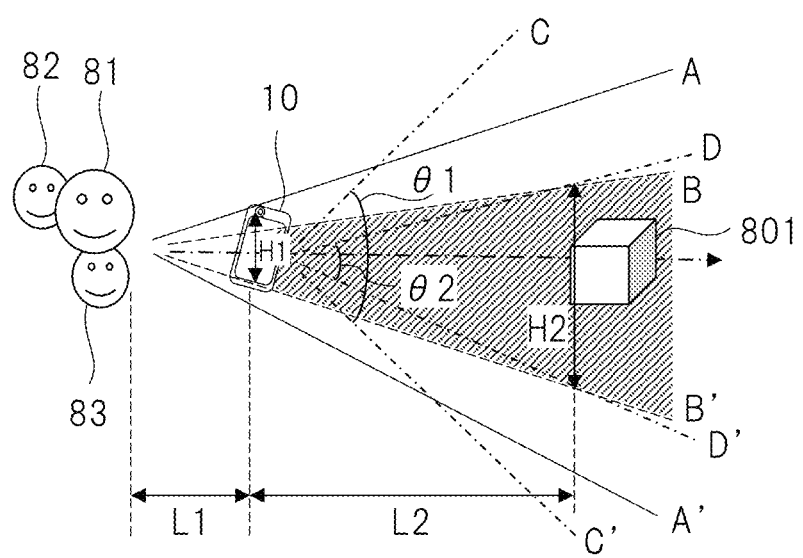

FIG. 4. is explanatory diagram showing examples of an imaging range and a display range by an out-camera which the display apparatus of FIG. 1 has;

FIG. 5 is an explanatory diagram showing an example of correction of a display range according to an attachment position of the out-camera which the display apparatus of FIG. 1 has;

FIG. 6 is explanatory diagram showing an example of an image displayed on a display unit which the display apparatus of FIG. 1 has;

FIG. 7 is explanatory diagram showing an example of display in moving the display apparatus of FIG. 1;

FIG. 8 is explanatory diagram showing another example of FIG. 7;

FIG. 9 is explanatory diagram showing an example of an external appearance in the display apparatus of FIG. 1; and FIG. 10 is an explanatory diagram showing an example of use in a display apparatus according to a second embodiment.

DETAILED DESCRIPTION OF PREFERRED EMBODIMENTS

In all the drawings for explaining the embodiments, the same members are denoted by the same reference symbols in principle and a repetitive description thereof will be omitted.

First Embodiment

Hereinafter, an embodiment will be described in detail.
<Example of Configuration of Display Apparatus>

FIG. 1 is an explanatory diagram showing an example of a configuration of a display apparatus 10 according to a first embodiment.

A display apparatus 10 includes a mobile terminal such as a smartphone or a tablet terminal. As shown in FIG. 1, the display apparatus 10 is configured by a CPU (Central Processing Unit) 101, a camera processor 102, an image processor 103, a memory unit 104, a communication controller 105, a sensor processor 106, a display unit 107, a voice input/output unit 108, and the like.

The CPU 101 controls each functional block by executing: an OS (Operating System) or application stored in the memory unit 104; a control program for controlling an operation of the display apparatus 10; or the like.

The camera processor 102 is configured by an in-camera 1021, an AF sensor 1022, an out-camera 1023, and an AF sensor 1024. The in-camera 1021 as a first imaging unit is a camera that is provided on a front surface side of the display apparatus 10, that is, to a first surface that is on a display unit 107 side. The AF sensor 1022 as a first distance detector measures a distance between the in-camera 1021 and a user of the display apparatus 10 to perform focus adjustment.

The out-camera 1023 as a second imaging unit is a camera provided on a side opposite to the in-camera 1021, that is, on a back side of the display apparatus 10 which is a second surface. The AF sensor 1024 as a second distance detector measures a distance between the out-camera 1023 and its imaging target to perform focus adjustment.

The sensor processor 106 is configured by a sensor group composed of a distance sensor 1061, a gyro sensor 1062, an acceleration sensor 1063, and a magnetic sensor 1064, etc.

The distance sensor 1061 is a sensor that monitors states such as a posture and a position of the display apparatus 10.

The gyro sensor 1062 is a sensor that detects angular velocity of the display apparatus 10 in a rotation direction. The acceleration sensor 1063 is a sensor that detects acceleration, and can detect gravity. The detection of gravity by the acceleration sensor 1063 makes it possible to detect an inclination etc. of the display apparatus 10. The magnetic sensor 1064 is a sensor that detects geomagnetism, and can detect an orientation (azimuth).

The image processor 103 is an image processing device called a so-called GPU (Graphics Processing Unit), and performs an image processing such as MR, VR, or AR. The display unit 107 is configured by a display device and a drive controller for driving and controlling the display device, and displays an image image-processed by the image processor 103 and the like. The display device is, for example, a liquid crystal display device, an organic EL (Electro Luminescence) device, or the like.

The memory unit 104 is composed of, for example, a semiconductor memory exemplified by a flash memory etc., and stores various kinds of pieces of information such as the above-mentioned application, OS, and control program, and setting information.

The applications stored in the memory unit 104 described above are AR applications, VR applications, MR applications, and the like that are applications for handling virtual objects and the like.

The communication controller 105 is a communication interface that wirelessly communicates with a router or the like via a wireless LAN (Local Area Network), and connects to an external network via the router or the like to send and receive information.

Alternatively, the communication controller 105 may be a communication interface that performs long-distance wireless communication with a base station of W-CDMA (Wideband Code Division Multiple Access), GSM (Global System for Mobile Communications) (registered trademark), or the like.

The voice input/output unit 108 includes a microphone for inputting external voice, a speaker for outputting voice outside, and the like.

<Display Processing Example of Display Apparatus>

Subsequently, a display method by the display apparatus 10 will be described with reference to FIGS. 2 and 3.

Figure 2:
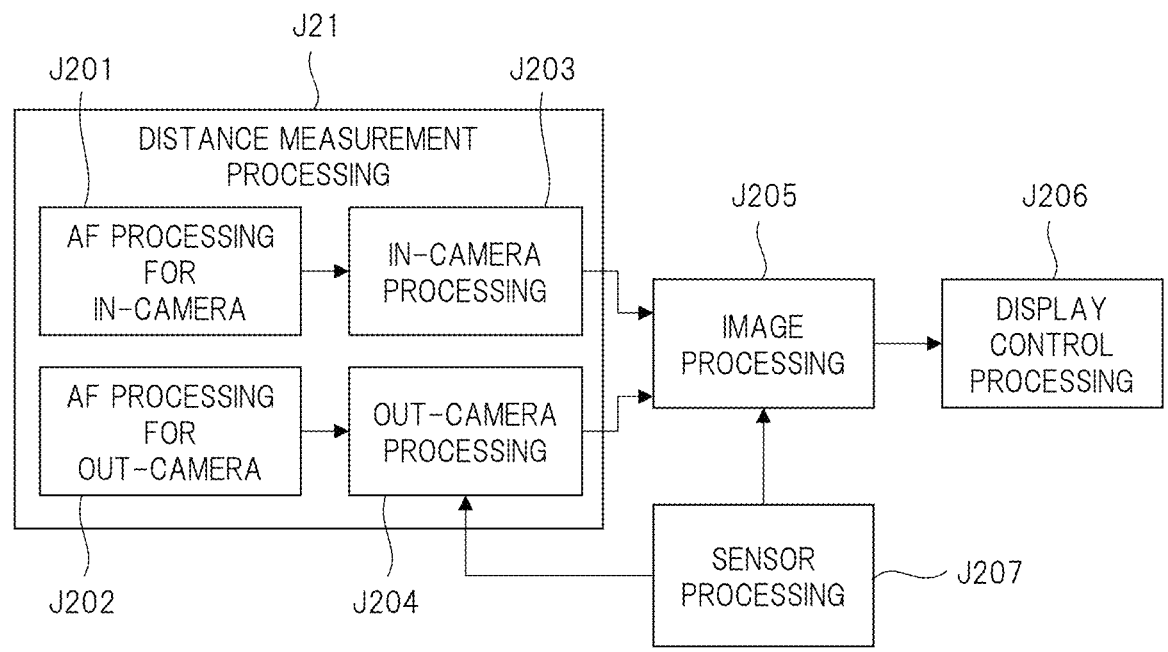
FIG. 2 is an explanatory diagram showing an example of control transition in the display apparatus of FIG. 1.

FIG. 2 is an explanatory diagram showing an example of control transitions in the display apparatus 10 of FIG. 1. FIG. 3 is a schematic diagram showing an example of display adjustment by the display apparatus 10 of FIG. 1. A transition processing shown in FIG. 2 is performed when an AR application or the like stored in the memory unit 104 is activated.

In FIG. 2, in a state J207 which is a sensor processing, the image processor 103 takes in sensor information detected by the sensor processor 106. In a state J21, a distance (distance L1 in FIG. 3) between the display apparatus 10 and the user who operates the display apparatus 10, and a distance (distance L2 in FIG. 3) between the display apparatus 10 and an object 32 that the user gazes are measured.

This state J21 is executed by the camera processor 102. In the state J21, performed respectively are a state J201 that is an in-camera AF processing (AF processing for in-camera) and a state J203 that is an in-camera processing, as well as a state J202 that is an out-camera AF processing (AF processing for out-camera) and a state J204 that is an out-camera processing.

In the state J21, a distance from the display apparatus 10 to user's eyes 31 is measured by using the in-camera 1021 and the AF sensor 1022. Further, a distance from the display apparatus 10 to the object 32 is measured by using the out-camera 1023 and the AF sensor 1024.

In the state J201 which is the in-camera AF processing, the AF sensor 1022 extracts distance information from the display apparatus 10 to the user's eyes 31. Subsequently, in the state J203 which is the in-camera processing, the AF sensor 1022 extracts a user's face imaged by the in-camera 1021 and recognizes the user's eyes 31 to extract eye position information (position information on the eyes).

Figure 3:
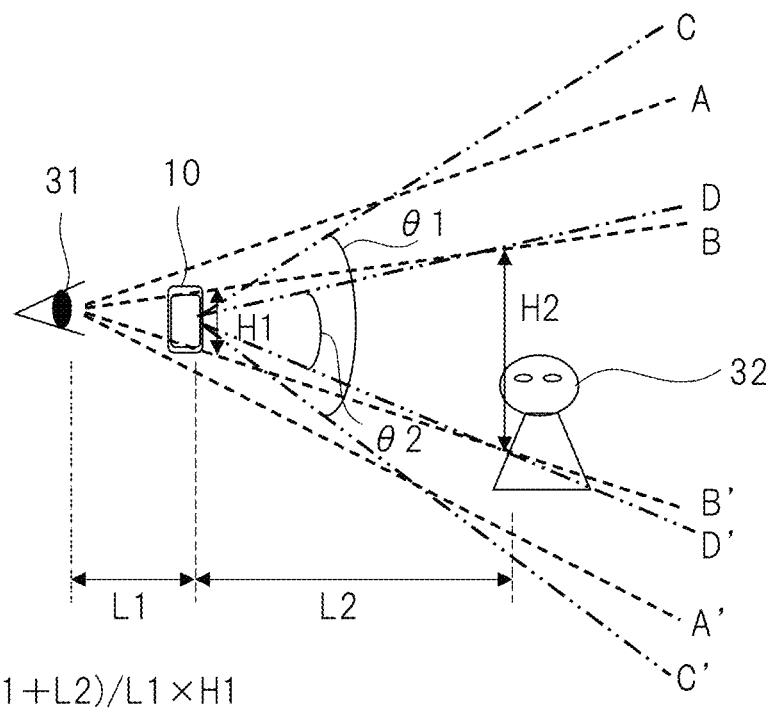
FIG. 3 is a schematic diagram showing an example of display adjustment by the display apparatus of FIG. 1.

Consequently, the image processor 103 obtains distance information L1 from the display apparatus 10 shown in FIG. 3 to the user's eyes 31 based on the above-mentioned distance information and eye position information.

Similarly, in the state J202 that is the out-camera AF processing and the state J204 that is the out-camera processing, the distance information from the display apparatus 10 to the object 32 is extracted. In this case, however, the AF sensor 1024 determines a focal point which focusing of the object 32 imaged by the out-camera 1023 matches with, and the image processor 103 thereby obtains distance information L2 that is the distance from the display apparatus 10 shown in FIG. 3 to the object 32.

Here, a rang A to A' shown in FIG. 3 indicates a range of a user's visual field, and a range B to B' indicates a range in which the visual field is interrupted (blocked) by the display apparatus 10. Further, a range C to C' indicates a photographing range of the out-camera 1023, and a range D to D' indicates a range of the images taken in by the out-camera 1023.

Regarding setting of a target to be imaged by the out-camera 1023, as a gazing point where the user views the display apparatus 10, the out-camera is operated so as to focus on an object existing near a center of the display screen of the display unit 107.

These states J201, J203 and these states J202, J204 may be executed at different timing, or the states J201, J203 and the states J202, J204 may be executed at substantially the same timing.

Next, in a state J205 in which the image processing is performed, the image processor 103 performs a processing such as cutout, enlargement, or reduction of a portion to be actually displayed by the display unit 107 from a range imaged by the out-camera 1023 based on the distance information L1 acquired in the state J203, the distance information L2 acquired in the state J204, and the sensor information fetched in in the state J207.

Here, the distance L2, which is a distance between the display apparatus 10 and the object 32 gazed by the user, may be infinity without the measurement by the AF sensor 1024. In a state J206 which is a display control processing, the display unit 107 displays an image generated by the image processor 103 in the state J205.

Thus, the display apparatus 10 generally unifies sizes of the image that the image processor 103 causes the display unit 107 to display and the object that the user views with the eyes 31, and causes the display unit 107 to display them, thereby performing the display control so that the real world and the image displayed on the screen, that is, the virtual space look almost the same.

In the following, described will be a process (method) from imaged video of the out-camera 1023 to the display on the display unit 107 in accordance with a purpose of the above-described display control.

Height H2 indicating height of a range to be displayed by the display apparatus 10 shown in FIG. 3 can be calculated (obtained) from the following formula by using the distance L1 and distance L2 described in the control transition of FIG. 2, and height H1 of the display screen of the display unit 107 in the display apparatus 10.

$$H2=(L1+L2)/L1 \times H1$$

Further, a field angle (angle of view) θ1 indicating an imaging range of the out-camera 1023 is set to be sufficiently wider than that captured by the user's eyes 31, so that if an imaging range of the height H2 at a position of the object 32 is extracted from a range imaged by the out-camera 1023 and is displayed by the display unit 107, it can be displayed with a feeling of size for substantially the same size as that of surrounding scenery as seen from the user 1. In other words, the imaging range of the height H2, which is to be a display imaging range, is trimmed from the range imaged by the out-camera 1023 and is displayed on the display unit 107.

Therefore, it is desirable that a lens provided in the out-camera 1023 is a lens having a wide field angle, that is, a so-called wide-angle lens. When the wide-angle lens is a fisheye lens, it can capture (take in) a scene in a range of approximately 180 degrees in vertical and horizontal directions. This makes it possible to photograph a front-side panoramic view at a wide angle.

To obtain the imaging range to be extracted, a field angle θ2 shown in FIG. 3 is calculated by the following formula.

$$\theta 2 = 2 \times \tan^{-1}((H2/2)/L2)$$

As described above, the image displayed on the display unit 107 is displayed at a magnification ratio (enlargement factor) $M=\theta 2/\theta 1$ and a physical appearance from the user becomes almost the same size as that of an object existing in a portion hidden by the display unit 107.

By the way, as a method of acquiring and displaying the image in the imaging range, acquisition and display of an external image by the out-camera 1023 may be unnecessary. In this case, for example, the display apparatus 10 is configured by such a panel as to be itself a transparent glass plate, that is, by a so-called transparent liquid crystal display etc.

This transparent liquid crystal display is a display that transmits a background like glass by changing a polarizing film of the liquid crystal panel to a special film. By applying a predetermined signal to this transparent liquid crystal display, an image is displayed at an arbitrary position and with an arbitrary density.

Consequently, the background can be seen through the display that transmits the background, so that only the virtual object needs to be displayed on the transparent liquid crystal display. Incidentally, transparency to be set in advance may be set based on the density of the displayed image.

The virtual object can also be displayed at a coordinate position linked to an external image based on information on: detection of a position of the user's eye 31 by the in-camera 1021; an angle between the position and the panel; and the like.

<Examples of Imaging Range and Display Range>

FIG. 4 is an explanatory diagram showing examples of an imaging range and a display range by the out-camera 1023 that the display apparatus 10 of FIG. 1 has.

FIG. 4 shows a relationship between the imaging range of the out-camera 1023 and the display range obtained by the above-mentioned formula.

FIG. 4(a) shows an example of cutting out and displaying a portion of a display range 42 from an imaging range 41 of the out-camera 1023. In this case, assuming that resolution of the imaging range 41 is Y1 in a vertical direction and X1 in a horizontal direction, the imaging range 42 having Y1/M and X1/M multiplied by 1/M times in the vertical and horizontal directions as shown in FIG. 4(a) is multiplied by M times and displayed on the display unit 107.

Meanwhile, FIG. 4(b) shows an example in which an initial setting angle θ1 of the out-camera 1023 is multiplied by M times and is displayed by an enlargement processing according to a lens optical system of the out-camera 1023 so that it becomes a field angle θ2. At this time, display magnification M is M=θ1/θ2, and the imaging range 42 remains unchanged.

The above description has been made on the assumption that the out-camera 1023 is attached substantially near a center of the display unit 107 that matches with the line-of-sight direction of the user. However, an attachment position of the out-camera 1023 does not need to be limited to vicinity of the center of the display screen.

As described above, in FIG. 4, explained has been the example in which a line-of-sight head is directed to the center of the screen of the display apparatus 10. In this case, displaying a dominant eye out of both eyes as a target makes it possible to further create a state of viewing the real world.

For that purpose, the distance L1 may be measured by using a dominant eye side as an origination during the distance measurement and be displayed and adjusted. The setting of the dominant eye is made by software such as an MR application, a VR application, or an AR application, and setting information that has been set is stored in the memory unit 104. The CPU 101 recognizes the set dominant eye by reading the setting information stored in the memory unit 104.

The setting of the dominant eye may be made, for example, when the software is started up, or the setting of the dominant eye may be made in an initial setting item(s) of the software. These settings are made from, for example, a menu etc. displayed on the display unit 107.

<Display Correction Example>

FIG. 5 is an explanatory diagram showing an example of correction of a display range according to an attachment position of the out-camera 1023 that the display apparatus 10 of FIG. 1 has.

FIG. 5(a) shows a relationship among the display apparatus 10, a center point Ct of a display screen portion of the display unit 107 indicated by a dotted line, and an attachment position P of the out-camera 1023. Further, FIG. 5(b) shows a relationship between an imaging range 41 and a display range 42 of the out-camera 1023.

In FIG. 5(a), it is assumed that when represented by coordinates in X-axis and Y-axis directions, respective positional relationships are an attachment position P (X1, Y1) of the out-camera 1023 and a screen center point Ct(0, 0) of the display unit 107.

At this time, as shown in FIG. 5(b), the image processor 103 corrects a display range to be extracted from the imaging range 41 so as to become a display range 42a that is respectively shifted by positions −X1 and −Y1 from a before-correction display range 42b. This makes it possible to reduce an influence of a display deviation due to the attachment position of the out-camera 1023.

Note that the above-described method can be applied to both cases of FIG. 4(a) and FIG. 4(b) as long as a relationship of "imaging range">"display range" is satisfied.

With the above correction, even when the display apparatus 10 is used in various directions in the real space by the user holding the display apparatus 10 in a hand(s) or the like, the image which displays the object imaged by the out-camera 1023 can be seen so as to be on almost the same line as a user's eye line.

A display state by the correction shown in FIG. 5 will be described with reference to FIG. 6.

FIG. 6 is an explanatory diagram showing an example of an image displayed on the display unit that the display apparatus 10 of FIG. 1 has.

As shown in FIG. 6, an image 321 displayed on the display unit 107 is displayed at approximately the same size as that of an object 32 seen from the user by performing the above-described size adjustment etc. to the object 32 in the real space hidden by the display apparatus 10.

This makes it possible to naturally enjoy, without any uncomfortable feeling, a linkage between the real world and a virtual space constructed by the display apparatus 10.

Note that in FIG. 6, a virtual image 62 is a virtual object that is not imaged and displayed but is constructed by the software such as the VR application, MR application, or AR application described above.

This virtual image 62 can have consistency with the imaging image about size since the image processor 103 adjusts and draws its display size according to display magnification M. As in this example, the virtual image 62 can be arbitrarily arranged in a space of live video (picture).

Note that the first embodiment has shown an example in which the virtual objects are superimposed on the imaged image, but a transmissive type display device can also be used as the display unit 107 as described above. In that case, as the virtual object, a virtual object to which the size adjustment has been performed is displayed so as to be viewed through the real space without displaying the imaged image.

In the display size adjustment of the virtual object, a size of an imaging area in the real space can be calculated as described above, so that if a reference size of the virtual object is determined, the display size can be adjusted according to a display magnification ratio M.

<Motion Correction in XYZ-Axial Directions>

Subsequently, a case where the user moves the display apparatus 10 held in a hand(s) or does performance of changing a viewing direction(s) will be described with reference to FIG. 7.

FIG. 7 is an explanatory diagram showing an example of display in moving the display apparatus 10 of FIG. 1.

FIG. 7(a) shows an example of moving the display apparatus 10 horizontally or vertically. ΔX shown in FIG. 7(a) is an amount of movement of the display apparatus 10 in the horizontal direction, and ΔY is an amount of movement of the display apparatus 10 in the vertical direction.

In this case, the object 32 displayed on the display unit 107 changes from a state shown in FIG. 6 to display 321 shown in FIG. 7(a). This is a state in which the display position has simply moved, so that adjustment can be performed by moving an extraction position of the imaged image with the out-camera 1023 in the same manner as described with reference to FIG. 5(b)

In addition to the case of FIG. 7(a), FIG. 7(b) shows an example of being moved to ΔZ that is a screen-vertical direction. ΔZ shown in FIG. 7(b) is an amount of movement of the display apparatus 10 in the screen-vertical direction, that is, in front and back directions.

In FIG. 7(b), by reflecting a movement amount ΔZ onto the distance L1 from the display apparatus 10 to the user and the distance L2 from the display apparatus 10 to the object 32 through calculation of the magnification ratio shown in FIG. 3, the magnification ratio after the movement can be calculated. Note that the movement amounts ΔX, ΔY, and ΔZ can be measured by using the acceleration sensor 1063 etc. shown in FIG. 1.

Further, the display apparatus 10 performs the display adjustment again only when the CPU 101 determines that a measured value(s) of the acceleration sensor 1063 or the like exceeds a movement amount threshold that is the set movement amount. This makes it possible to suppress an increase in power consumption and a frequent change in the display screen.

In addition, a minute displacement of the display apparatus caused by the user holding it in a hand(s) can be suppressed by providing the camera processor 102 of FIG. 1 with a camera-shake preventing function not shown. This makes it possible to reduce difficulty in viewing the display screen displayed on the display unit 107 due to camera shake.

Further, a distance from the display apparatus 10 to the user or the object 32 may be measured by using, for example, the distance sensor 1061 of FIG. 1 instead of using an autofocus function of the camera processor 102. In that case, used as the distance sensor 1061 is, for example, a sensor using infrared rays, ultrasonic waves, or the like.

Moreover, the display apparatus 10 controls enlargement/reduction so that the virtual object is seen at almost the same appearance as that in the real space according to the magnification ratio M. However, by operating the magnification ratio M, the appearance of the virtual object may be displayed slightly smaller or, conversely, slightly larger than that in the real space.

This makes it possible for the user of the display apparatus 10 to easily understand the relationship with the real space. In this case, a magnification setting item regarding display of enlargement, reduction, or equal magnification may be displayed on the display unit 107 so that the user can select desired display.

<Another Example of Motion Correction>

FIG. 8 is an explanatory diagram showing another example of FIG. 7.

FIG. 8 shows a state in which the display apparatus 10 held by the hand of the user moves so as to be tilted from a vertical state and have a depression angle.

When the display apparatus 10 is in the vertical state, an imaging range of the out-camera 1023 is a range C to C' as shown in the figure. When the display apparatus 10 tilts from the vertical state to the depression angle as shown by dotted lines of FIG. 8, the imaging range of the out-camera 1023 becomes the range C1 to C1'.

Even if the imaging range changes due to a change in an inclination of the display apparatus 10, the image processor 103 maintains the image in a range interrupted by the display apparatus 10 from the user's eyes 31 and displays it on the display unit 107.

In this case, the image in the range interrupted by the display apparatus 10 is slightly changed depending on an inclination of the display apparatus 10, but becomes a range between the nearly ranges B to B' shown by hatchings in FIG. 8. Therefore, the image processor 103 causes the display unit 107 to display the image in the range between the nearly ranges B to B' even if the imaging range changes due to the change in the inclination of the display apparatus 10.

Thus, even if the inclination of the display apparatus 10 changes due to being held by the hand or the like, the display object viewed by the user on the display screen of the display unit 107 does not move with respect to the outer world of a portion not interrupted by the display apparatus 10 or its movement is reduced, so that the image with presence (realistic sensation) can be provided.

<Another Configuration Example of Display Apparatus>

FIG. 9 is an explanatory diagram showing an example of an external appearance of the display apparatus 10 of FIG. 1.

In a display apparatus 10 shown in FIG. 9, a switching button 2000, which is a software button, is displayed on the display unit 107.

This switching button 2000 is a button for switching, for example, a display mode for displaying an image imaged by the out-camera 1023 (hereinafter, referred to as a camera display mode) and a display mode displayed by software such as an AR application for handling virtual objects (hereinafter, referred to as a transparent mode).

When the user touches the switching button 2000, the camera display mode and the transparent mode are switched. A switching processing is executed by the CPU 101 based on a signal inputted from the button 2000, for example.

Whether the display mode is the camera display mode or the transparent mode is displayed by a change of display color of the switching button 2000, a change of a character(s), or the like, so that the user can easily understand which mode the display mode is.

Furthermore, if the AR application and the like have any mode not corresponding to the transparent mode, a non-transparent-mode-compliant mark may be superimposedly displayed on an application icon.

Each of the examples shown in FIGS. 3 to 8 shows an example in which the display apparatus 10 is held in a vertically long state, but the display apparatus 10 may be held in a horizontally long state.

As described above, the uncomfortable feelings felt by the user can be reduced by displaying the real world and the image displayed on the screen while the linkage therebetween is maintained so as to be seen at substantially the same size.

Second Embodiment

<Example of Use by Multiple People>

In a second embodiment, an example of using the display apparatus 10 by a large number of people will be described.

FIG. 10 is an explanatory diagram showing an example of use in a display apparatus 10 according to a second embodiment.

FIG. 10 shows an example in which the display apparatus 10 of FIG. 1 is used by a plurality of persons. Here, it is assumed that in addition to a person 81 who is an owner of a display apparatus 10, the display apparatus 10 is utilized by persons 82 and 83.

Hereinafter, a method of determining a distance L1 in FIG. 10 will be described. The following processing is mainly performed by the image processor 103.

First, the image processor 103 determines a person's face on a user side, which is imaged by the in-camera 1021 incorporated in the display apparatus 10. At this time, the person 81, the person 82, and the person 83 are determined as persons. This makes it possible for the image processor 103 to recognize that the number of users is two or more.

The image processor 103, which has recognized that the number of users is two or more, determines the distance L1 based on a result of face determination. In this case, used as a method of determining the distance L1 is, for example, one of the following first determination method, second determination method, third determination method, fourth determination method, or fifth determination method.

A first determination method is a method in which a distance to the person closest to the display apparatus 10 or to the person having the largest area imaged by the in-camera 1023 of the display apparatus 10 is set as the distance L1. The CPU 101 identifies the person having the largest area among the persons to be imaged, acquires a distance to the identified person measured by the AF sensor 1022 as a distance L1, and outputs it to the image processor 103.

A second determination method is a method in which a distance to the closest person to a center in an imaging range of the in-camera 1021 is set as the distance L1. Also in this case, the CPU 101 identifies the closest person to a central portion among the imaged persons, acquires a distance to the identified person measured by the AF sensor 1022 as the distance L1, and outputs it to the image processor 103.

A third determination method is a method in which an average value of respective distances to the persons 80, 81, 82 imaged by the in-camera 1021 is set as the distance L1. In this case, the CPU 101 acquires the distances to the persons 80, 81, 82 measured by the AF sensor 1022, and calculates an average of the acquired distances. Then, the calculated distance is acquired as the distance L1 and outputted to the image processor 103.

A fourth determination method is a method in which a distance from the person holding the display apparatus 10 in a hand to the display apparatus 10 is set at the distance L1. From the shaking caused by the image processor 103 and the display apparatus 10 being held in the hand, a mutual relationship between analysis results of its shaking direction and shaking width and shaking of the imaged person(s) is taken, and the person who holds the display apparatus 10 in the hand is determined. Then, based on the determination result, the distance between the display apparatus 10 and the person's hand holding it is set at the distance L1.

A fifth determination method is a method of setting, as the distance L1, a distance from a user registered in advance to the display apparatus 10. In this case, a face of the user is photographed (captured) and registered in advance by the in-camera 1021 or the like. A registration result thereof is stored in the memory unit 104, for example. The image processor 103 performs image recognition of the face captured by the image of the in-camera 1021 when the AR application or the like is activated, and determines that a face which has matched with the registered face is the user.

Further, as the fifth determination method, for example, when the AR application or the like is activated, the CPU 101 may recognize a face first captured by the in-camera 1021 as a user and register the face. When the registered face has not been photographed for a preset time, the registered face is deleted and a face currently photographed may be registered as the user.

Which of the determination methods is selected may be made selectable by setting the display apparatus 10, or may be made selectable by determining the determination method in advance and by storing, as setting information, the setting in the memory unit 104 when the AR application or the like is activated.

Subsequently, the CPU 101 measures a distance L2 to an object 801 in the same manner as that in the example shown in FIG. 3 to obtain imaging height H2 and an imaging field angle θ2 at that time, and calculates a display magnification ratio M. This makes it possible to display the image such as a virtual object on the display apparatus 10 in such feeling as to extract a part of the real world.

At this time, when the display apparatus 10 is viewed by a large number of people, the display image of the display apparatus 10 viewed by a plurality of people and the real image of the visual field (eyesight) viewed by each person may differ due to some deviation in the line-of-sight direction.

Therefore, the image processor 103 is set at a magnification ratio smaller than a value of the display magnification ratio M, and displays a range wider than an area hidden by the display apparatus 10. This makes it possible to view the image in the line-of-sight direction also by any user who is viewing the display apparatus 10. As a result, the usability of the display apparatus 10 can be improved.

For example, the display magnification ratio M can be changed according to the number of persons recognized by the in-camera 1021. If the number of imaged persons captured by the in-camera 1021 is one, the display magnification is set at M1; if the number of imaged persons is two, the magnification ratio is set at M2; and if the number of imaged persons is three, the magnification ratio is set at M3. Therefore, the display is adjusted according to the number of people viewing the display apparatus 10, which improves usability. Here, it is assumed that M1>M2>M . . . .

Further, similarly to a case of the first embodiment, constructing the virtual object in accordance with the above-described magnification ratio makes it possible to arrange the virtual object in an appropriate size on the display image.

Note that the display apparatus 10 may construct an AR image by projecting it on a projection plate by a device such as a projector instead of a mobile terminal such as a smartphone or a tablet terminal.

In this case, since the screen is large, such a situation occurs that more people view it at the same time. However, as described with reference to FIG. 9, irradiation is performed so that when each viewing person and all people see it, uncomfortable feeling is minimized to the extent possible.

Thus, even when a large number of users use the display apparatus 10, the image to be displayed on the screen can be displayed while the linkage with the real world is maintained, so that the uncomfortable feeling which the users have can be reduced.

As described above, although the invention made by the inventors of the present application has been specifically described based on the embodiments, the present invention is not limited to the embodiments and, needless to say, can be variously modified without departing from the scope of the invention.

In the above-mentioned first and second embodiments, an example in which the display apparatus 10 is held in a vertically long state has been shown, but the display apparatus 10 may be held in a horizontally long state.

Note that the present invention is not limited to the above-described embodiments, and includes various modification examples. For example, the above-described embodiments have been described in detail in order to explain the present invention in an easy-to-understand manner, and are not necessarily limited to those having all the configurations described.

Further, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

10 Display Apparatus;
101 CPU;
102 Camera Processor;
103 Image processor;
104 Memory unit;
105 Communication Controller;
106 Sensor processor;
107 Display unit;
108 Audio Input/Output Unit;
1021 In-camera;
1022 AF Sensor;
1023 Out-camera;
1024 AF Sensor;
1061 Distance Sensor;
1062 Gyro Sensor;
1063 Acceleration Sensor; and
1064 Magnetic Sensor.

The invention claimed is:

1. A display apparatus comprising:
a first imaging sensor provided on a first surface and configured to image a user;
a first distance detecting sensor configured to identify an eye of the user imaged by the first imaging sensor and measure a first distance that is a distance from the identified eye to the first imaging sensor;
a second imaging sensor provided on a second surface opposite to the first surface and configured to image an object;
a second distance detecting sensor configured to measure a second distance that is a distance from the second imaging sensor to the object imaged by the second imaging sensor;
image processing circuitry configured to process the images imaged by the first and second imaging sensors; and
a display configured to display the images to which the image processing circuitry performs an image processing, wherein
the image processing circuitry calculates a display imaging range displayed by the display based on the first distance measured by the first distance detecting sensor, the second distance measured by the second distance detecting sensor, and height of the display, extracts the calculated display imaging range from the image imaged by the second imaging sensor, and causes the display to display it,
the display imaging range calculated by the image processing circuitry is such a range that the object displayed by the display and an external scenery not interrupted by the display seen from a viewpoint of the user have the same size, and
the image processing circuitry determines whether the number of users is two or more from an image of the users imaged by the first imaging sensor, and sets, as the first distance, a distance from the eye of a user closest to the display apparatus to the first imaging sensor among the two or more users when it is determined that the number of users is two or more.

2. A display apparatus comprising:
a first imaging sensor provided on a first surface and configured to image a user;
a first distance detecting sensor configured to identify an eye of the user imaged by the first imaging sensor and measure a first distance that is a distance from the identified eye to the first imaging sensor;
a second imaging sensor provided on a second surface opposite to the first surface and configured to image an object;
a second distance detecting sensor configured to measure a second distance that is a distance from the second imaging sensor to the object imaged by the second imaging sensor;
image processing circuitry configured to process the images imaged by the first and second imaging sensors; and
a display configured to display the images to which the image processing circuitry performs an image processing, wherein
the image processing circuitry calculates a display imaging range displayed by the display based on the first distance measured by the first distance detecting sensor, the second distance measured by the second distance detecting sensor, and height of the display, extracts the calculated display imaging range from the image imaged by the second imaging sensor, and causes the display to display it,
the display imaging range calculated by the image processing circuitry is such a range that the object displayed by the display and an external scenery not interrupted by the display seen from a viewpoint of the user have the same size, and
the image processing circuitry determines whether the number of users is two or more from an image of the users imaged by the first imaging sensor, and sets, as the first distance, a distance from the eye of a user holding the display apparatus in a hand to the display apparatus among the two or more users when it is determined that the number of users is two or more.

3. A display apparatus comprising:
a first imaging sensor provided on a first surface and configured to image a user;
a first distance detecting sensor configured to identify an eye of the user imaged by the first imaging sensor and measure a first distance that is a distance from the identified eye to the first imaging sensor;
a second imaging sensor provided on a second surface opposite to the first surface and configured to image an object;
a second distance detecting sensor configured to measure a second distance that is a distance from the second imaging sensor to the object imaged by the second imaging sensor;
image processing circuitry configured to process the images imaged by the first and second imaging sensors; and
a display configured to display the images to which the image processing circuitry performs an image processing, wherein
the image processing circuitry calculates a display imaging range displayed by the display based on the first distance measured by the first distance detecting sensor, the second distance measured by the second distance detecting sensor, and height of the display, trims an image range smaller than the calculated display imaging range from an imaging range imaged by the second imaging sensor, and causes the display to display it,
the display imaging range calculated by the image processing circuitry is such a range that the object displayed by the display and an external scenery not interrupted by the display seen from a viewpoint of the user have the same size.

4. The display apparatus according to claim 3, wherein the image processing circuitry determines whether the number of users is two or more from an image of the users imaged by the first imaging sensor, trims an image range smaller than the calculated display imaging range from the imaging range imaged by the second imaging sensor when it is determined that the number of users is two or more, and causes the display to display it.

5. The display apparatus according to claim 4, wherein the image processing circuitry changes a size of the image range to be trimmed in accordance with the number of users.

6. The display apparatus according to claim 3, wherein the image processing circuitry determines whether the number of users is two or more from an image of the users imaged by the first imaging sensor, calculates an average value of the distances from eyes of the two or more users to the first imaging sensor when it is determined that the number of users is two or more, and sets the calculated average value as the first distance.

7. The display apparatus according to claim 3, wherein the image processing circuitry determines whether the number of users is two or more from an image of the users imaged by the first imaging sensor, and sets, as the first distance, a distance from the eye of the user having the largest imaging area to the first imaging sensor among the two or more users when it is determined that the number of users is two or more.

8. The display apparatus according to claim 3, wherein the image processing circuitry determines whether the number of users is two or more from an image of the users imaged by the first imaging sensor, and sets, as the first distance, a distance from the eye of the user at a position closest to a central portion of the image imaged by the first imaging sensor to the first imaging sensor when it is determined that the number of users is two or more.

9. A display apparatus comprising:
a first imaging sensor provided on a first surface and configured to image a user;
a first distance detecting sensor configured to identify an eye of the user imaged by the first imaging sensor and measure a first distance that is a distance from the identified eye to the first imaging sensor;
a second imaging sensor provided on a second surface opposite to the first surface and configured to image an object;
a second distance detecting sensor configured to measure a second distance that is a distance from the second imaging sensor to the object imaged by the second imaging sensor;
image processing circuitry configured to process the images imaged by the first and second imaging sensors; and
a display configured to display the images to which the image processing circuitry performs an image processing, wherein
the image processing circuitry calculates a display imaging range displayed by the display based on the first distance measured by the first distance detecting sensor, the second distance measured by the second distance detecting sensor, and height of the display, extracts the calculated display imaging range from the image imaged by the second imaging sensor, and causes the display to display it,
the display imaging range calculated by the image processing circuitry is such a range that the object displayed by the display and an external scenery not interrupted by the display seen from a viewpoint of the user have the same size, and
the image processing circuitry determines whether the number of users is two or more from an image of the users imaged by the first imaging sensor, and sets, as the first distance, a distance from a user registered in advance to the display apparatus among the two or more users when it is determined that the number of users is two or more.

10. The display apparatus according to claim 3,
wherein the image processing circuitry generates a virtual image having a display size adjusted according to the display imaging range, and causes the display to display it.

11. The display apparatus according to claim 3, further comprising a detecting sensor configured to detect a movement amount of the display apparatus,
wherein the image processing circuitry calculates the display imaging range after movement of the display apparatus based on a detection result detected by the detecting sensor, extracts the calculated display imaging range from the image imaged by the second imaging sensor, and causes to the display to display it.

12. The display apparatus according to claim 11,
wherein the detecting sensor detects a horizontal movement amount of the display apparatus and a vertical movement amount of the display apparatus.

13. The display apparatus according to claim 11,
wherein the detecting sensor detects a horizontal movement amount of the display apparatus, a vertical movement amount of the display apparatus, and a front-back movement amount of the display apparatus.

14. The display apparatus according to claim 11,
wherein the image processing circuitry calculates the display imaging range when the movement amount detected by the detecting sensor exceeds a preset movement amount threshold value.

* * * * *